US009311366B2

(12) United States Patent
Tang et al.

(10) Patent No.: US 9,311,366 B2
(45) Date of Patent: Apr. 12, 2016

(54) INTERACTIVE OBJECT RETRIEVAL METHOD AND SYSTEM

(71) Applicant: Industrial Technology Research Institute, Hsinchu (TW)

(72) Inventors: Tsann-Tay Tang, Taipei (TW); Yu-Feng Hsu, Taipei (TW); Ming-Yu Shih, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 234 days.

(21) Appl. No.: 13/941,560

(22) Filed: Jul. 15, 2013

(65) Prior Publication Data

US 2014/0188847 A1     Jul. 3, 2014

(30) Foreign Application Priority Data

Dec. 27, 2012  (TW) .............................. 101150370 A (51) Int. Cl.
*G06F 7/00* (2006.01)
*G06F 17/30* (2006.01)
*G06F 17/10* (2006.01)

(52) U.S. Cl.
CPC .... *G06F 17/30551* (2013.01); *G06F 17/30064* (2013.01); *G06F 17/30241* (2013.01); *G06F 17/30861* (2013.01); *G06F 17/30867* (2013.01)

(58) Field of Classification Search
CPC .................... G06F 17/30064; G06F 17/30861; G06F 17/30867; G06F 17/30551; G06F 17/30241
USPC .................................................. 707/722, 755
See application file for complete search history.

(56) References Cited

U.S. PATENT DOCUMENTS

| 5,696,964 | A  | 12/1997 | Cox et al. |
| 6,226,636 | B1 | 5/2001  | Abdel-Mottaleb et al. |
| 6,845,371 | B1 | 1/2005  | Lee et al. |
| 7,493,340 | B2 | 2/2009  | Rui |
| 7,529,732 | B2 | 5/2009  | Liu et al. |

(Continued)

FOREIGN PATENT DOCUMENTS

| TW | 200740224 | 10/2007 |
| TW | 200919233 | 5/2009 |
| TW | 201020821 | 6/2010 |

OTHER PUBLICATIONS

J. R. Smith, et al., "VisualSEEk: a Fully Automated Content-Based Image Query System", ACM Multimedia, Nov. 1996, pp. 1-12.

(Continued)

*Primary Examiner* — Kannan Shanmugasundaram
(74) *Attorney, Agent, or Firm* — Jianq Chyun IP Office (57) ABSTRACT

An interactive object retrieval method is provided. The present method includes receiving a time-space searching condition and a query, and selecting a plurality of searching results from an object database in accordance with the time-space searching condition, a similarity between the query and each of a plurality of data records of a first category in the object database, and a time information and a location information corresponding to each of a plurality of data records of a second category in the object database. The method further includes receiving at least one user input corresponding to at least one of the searching results, and determining a display manner of the searching results on a user interface in accordance with the at least one user input and the similarity between the query and each searching result.

12 Claims, 7 Drawing Sheets

900

(56) References Cited

U.S. PATENT DOCUMENTS

| | | | |
|---|---|---|---|
| 2007/0115373 A1* | 5/2007 | Gallagher et al. | ......... 348/231.3 |
| 2011/0302206 A1 | 12/2011 | Lipson et al. | |
| 2012/0117048 A1 | 5/2012 | Rosenoff et al. | |

OTHER PUBLICATIONS

Yong Riu, et al., "Relevance Feedback: a Power Tool for Interactive Content-Based Image Retrieval", IEEE, Transactions on Circuits and Video Technology, Sep. 1998, pp. 1-13.

Zhong Su, et al., "Relevance Feedback in Content-Based Image Retrieval: Bayesian Framework, Feature Subspaces, and Progressive Learning", IEEE, Transactions on Image Processing, vol. 12, No. 8, Aug. 2003, pp. 924-937.

Till Quack, et al., "Cortina: A System for Large-scale, Content-based Web Image Retrieval", ACM Multimedia, Oct. 2004, pp. 1-4.

Youlu Wang, et al., "Wide-Area Multi-Object Tracking with Non-Overlapping Camera Views", IEEE, International Conference on Multimedia and Expo (ICME), Jul. 2011, pp. 1-6.

Francisco Moraes Oliveira-Neto, et al., "Online License Plate Matching Procedures Using License Plate Recognition Machines and New Weighted Edit Distance", Transportation Research Part C 21, Apr. 2012, pp. 306-320.

"Office Action of Taiwan Counterpart Application", issued on Oct. 14, 2014, p. 1-p. 16.

* cited by examiner

INTERACTIVE OBJECT RETRIEVAL METHOD AND SYSTEM

CROSS-REFERENCE TO RELATED APPLICATION

This application claims the priority benefit of Taiwan application serial no. 101150370, filed on Dec. 27, 2012. The entirety of the above-mentioned patent application is hereby incorporated by reference herein and made a part of this specification.

TECHNICAL FIELD

The disclosure relates to an object retrieval method. Particularly, the disclosure relates to an interactive object retrieval method and system.

BACKGROUND

Along with growing rise of safety monitoring requirements, city and county governments install surveillance cameras widely on roads. However, it also means that the amount of data required to be processed becomes huge, and when a case is investigated, a huge manpower is required to inspect related information. Therefore, various police units actively seek solutions for automatic video content analysis, for example, moving object detection, object classification, license plate detection and recognition, etc., so as to accelerate a case-handling process.

Besides image analysis of a single camera, another automation function which is able to assist the police to handle the case is cross-camera object association, and an application example thereof is to lock an object to be searched at first (for example, a suspect, a suspect car or a stolen car, etc.), and then find appearance time of the same object from different cameras, so as to connect a moving track of the object on a map, which can be facilitated to determine the possible behavior of the object or the possible location that could be appeared subsequently, so as to intercept any suspicious objects as soon as possible.

In the current surveillance camera network, due to different resolutions of the cameras and different light and shadow conditions, accuracy of the automated analysis algorithm is still required to be improved. Since the quantity of the surveillance cameras is huge, the amount of captured video data is huge, and it is time-consuming in data processing. Therefore, how to obtain accurate searching results effectively may be an issue to be developed.

SUMMARY

Accordingly, the disclosure is directed to an interactive object retrieval method and system.

The disclosure provides an interactive object retrieval method. The method includes following steps. A query and a time-space searching condition are received. A plurality of searching results are selected from an object database according to the time-space searching condition, a similarity between the query and each of a plurality of data records of a first category in the object database, and time information and location information corresponding to each of a plurality of data records of a second category in the object database. At least one user input corresponding to at least one of the searching results is received, and a display manner of each of the searching results on a user interface is determined according to the at least one user input and a similarity between the query and each of the searching results.

The disclosure provides an interactive object retrieval system, which includes a filtering module and an interactive module coupled to each other. The filtering module is used to select a plurality of searching results from an object database according to a time-space searching condition, a similarity between a query and each of a plurality of data records of a first category in the object database, and time information and location information corresponding to each of a plurality of data records of a second category in the object database. The interactive module receives at least one user input corresponding to at least one of the searching results, and provides a user interface. The filtering module determines a display manner of each of the searching results on the user interface according to the at least one user input and a similarity between the query and each of the searching results.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

The disclosure provides an interactive object retrieval technique based on association information. By considering a time-space limitation condition, dependency between data records of objects recorded in an object database, and user's feedback on preliminary searching results, more accurate formal searching results can be generated. Moreover, during a process of generating the formal searching results, an interactive user interface is provided to receive the user's feedback and dynamically adjust an output manner of the searching results, so as to improve searching convenience. In order to convey the spirit of the disclosure, embodiments are provided below to describe the disclosure in detail.

Figure 1:
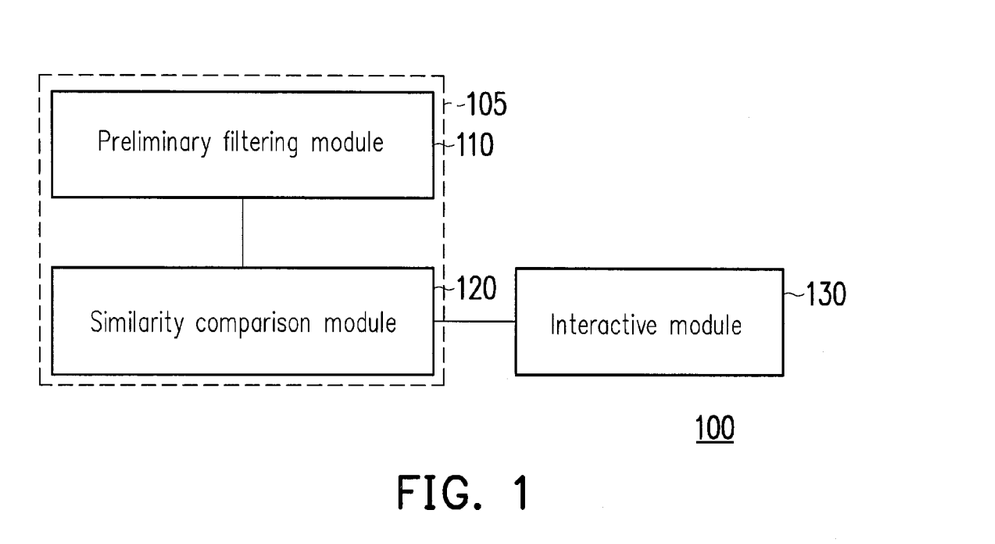
FIG. 1 is a schematic diagram of an interactive object retrieval system based on association information according to an embodiment of the disclosure.

FIG. 1 is a schematic diagram of an interactive object retrieval system based on association information according to an embodiment of the disclosure. Referring to FIG. 1, the interactive object retrieval system based on association information 100 (referring to as the system 100 in the following) includes a filtering module 105 and an interactive module 130 coupled to each other. In an embodiment, the filtering module 105 further includes a preliminary filtering module 110 and a similarity comparison module 120 coupled to each other.

In the present embodiment, the system 100 may be implemented in a single or a plurality of hardware devices. Further, various modules in the system 100 may be implemented by hardware, software, or a combination of hardware and software. For example, the hardware includes a central processing unit (CPU), a programmable genera-purpose or special-purpose microprocessor, a digital signal processor (DSP), a programmable controller, an application specific integrated circuit (ASIC), a computer system, a workstation, a server, or any device having operating and processing capability or a combination of the aforementioned devices. The software includes an operating system, an application program or a driving program. Moreover, data transmission between the modules may be implemented through system bus or network, which is not limited by the disclosure.

Figure 2A:
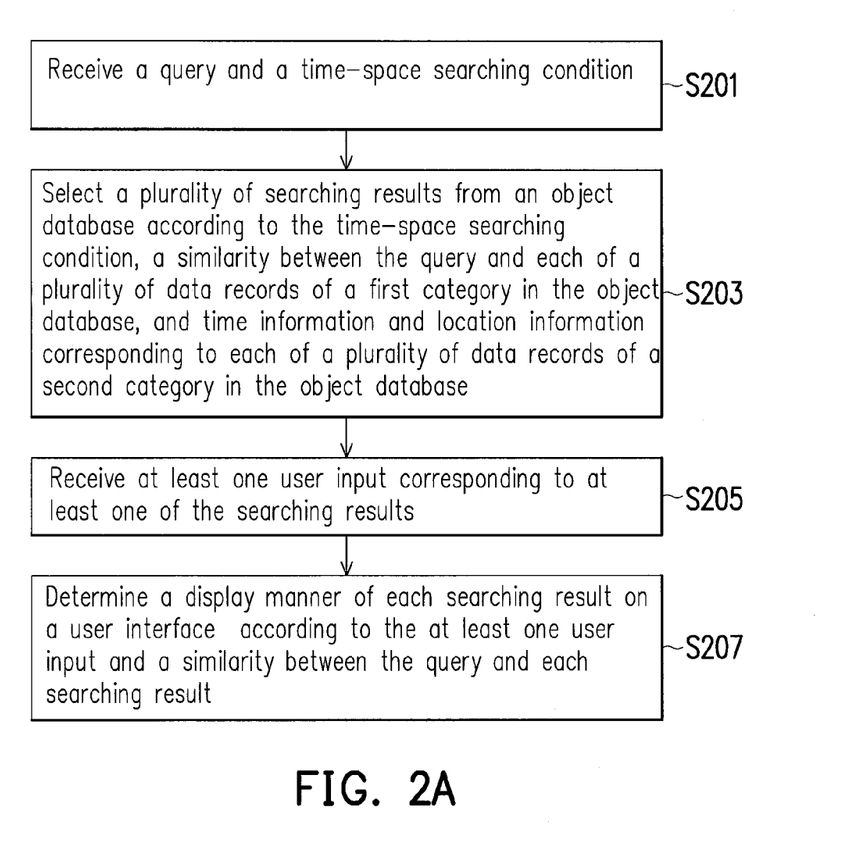
FIG. 2A is a flowchart illustrating an interactive object retrieval method based on association information according to an embodiment of the disclosure.

In order to further describe a detailed operation method of the system 100, another embodiment is provided below for description. FIG. 2A is a flowchart illustrating an interactive object retrieval method based on association information according to an embodiment of the disclosure.

Referring to FIG. 1 and FIG. 2A, in step S201, the system 100 receives a query and a time-space searching condition input by the user.

In step S203, the filtering module 105 selects a plurality of searching results from an object database according to the time-space searching condition, a similarity between the query and each of a plurality of data records of a first category in the object database, and time information and location information corresponding to each of a plurality of data records of a second category in the object database. For example, the data records of the first category are the entire data records recorded in the object database while the data records of the second category are also the entire data records recorded in the object database. Alternatively, the data records of the first category and the data records of the second category may be a part of data records recorded in the object database, for example, the data records of the first category is selected from all of the data records recorded in the object database, and the data records of the second category is selected from the data records of the first category.

Then, in step S205, the interactive module 130 receives at least one user input corresponding to at least one of the searching results.

Finally, in step S207, the filtering module 105 determines a display manner of each of the searching results on a user interface provided by the interactive module 130 according to the user input and a similarity between the query and each of the searching results. In another embodiment, the filtering module 105 determines a display manner of each of the searching results on a user interface provided by the interactive module 130 and calibrates the similarity between each of the searching results and the query according to the user input, the similarity between each of the searching results and the query before calibration, and the time information corresponding to each of the searching results, so as to select a plurality of formal searching results from the searching results.

As shown in FIG. 2A, the user that intending to perform the object searching may connect to the system 100 through a user terminal, and inputs the query and the time-space searching condition related to an object, and the system 100 generates the searching results accordingly. The user terminal is, for example, a desktop computer, a notebook computer, a tablet computer, a mobile phone, a smart phone, or a personal digital assistant, etc. The user terminal may be connected to the system 100 through network connection.

Figure 2B:
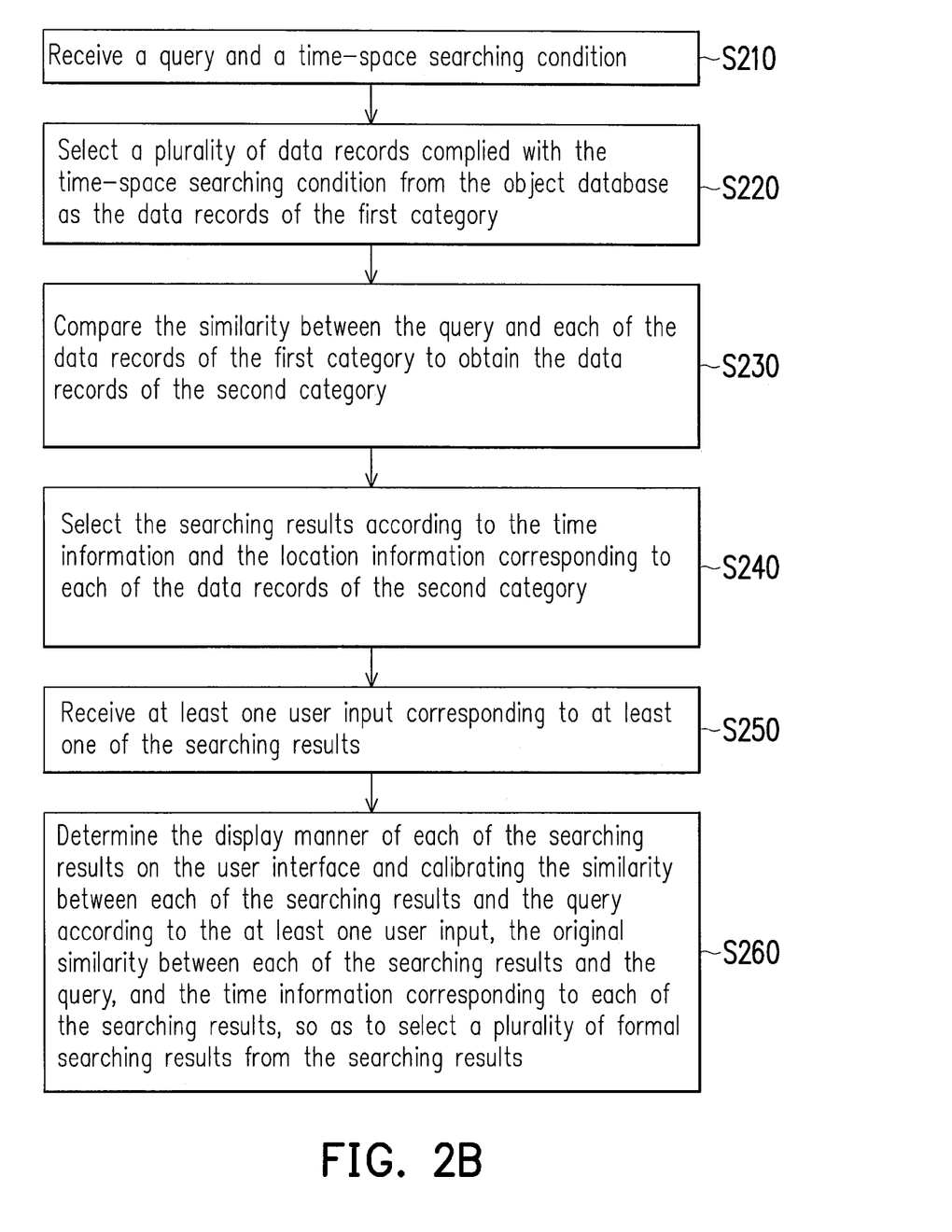
FIG. 2B is a flowchart illustrating an interactive object retrieval method based on association information according to another embodiment of the disclosure.

FIG. 2B is a flowchart illustrating an interactive object retrieval method based on association information according to another embodiment of the disclosure.

Referring to FIG. 1 and FIG. 2B, in step S210, the system 100 receives a query and a time-space searching condition input by the user. For example, when the system 100 is used to search the videos captured by the security surveillance cameras installed on the road, the query may be various characteristics of the passing vehicles such as a license plate, a vehicle color or a vehicle model, etc., which is not limited by the disclosure. The time-space searching condition may include a geographical range and/or a time range to be searched.

In step S220, the preliminary filtering module 110 selects a plurality of data records complied with the time-space searching condition from all of the data records recorded in the object database as the data records of the first category, so as to preliminarily reduce a searching range. In an embodiment, each data record in the object database corresponds to a time field, a location field and a plurality of characteristic fields. The time field and the location field respectively record the time information and the location information related to the data record, for example, a time and a location of obtaining the data record. Each of the characteristic fields respectively record various characteristics of an object related to the data record, and when the preliminary filtering module 110 performs the filtering operation, it compares contents of the time field, the location field and the characteristic field of each of the data records to find the data records complied with the time-space searching condition and complied with the characteristic of the query to serve as the data records of the first category. In another embodiment, the object database records the original data records and the corresponding time information and location information, and during the filtering operation, the preliminary filtering module 110 performs a characteristic acquisition operation on each of the original data records to select the suitable data records of the first category. It should be noticed that the object database may be built in the system 100, or set in a remote end, and is accessed by the system 100 through a network.

The preliminary filtering module 110 transmits the selected data records of the first category to the similarity comparison module 120, and in step S230, the similarity comparison module 120 compares a similarity between the query and each of the data records of the first category to obtain a plurality of data records of a second category from all of the data records of the first type. For example, the similarity comparison module 120 may use an edit distance algorithm or a longest common subsequence algorithm to calculate the similarity between the query and each of the data records of the first category. The algorithm used for calculating the similarity is not limited by the disclosure.

In step S240, the similarity comparison module 120 selects a plurality of searching results from the data records of the second type according to the time information and the location information corresponding to each of the data records of the second category. Such step can effectively decrease the number of the searching results, and retain the appropriate searching results to decrease searching error. Further, the similarity comparison module 120 analyses the dependency of all the data records of the second category obtained from the object database, so as to determine whether certain of the searching results have possibility of mutual enhancement, and eliminates the searching results which are mutually exclusive. By considering the dependency between the data records of the second category, the searching result can be more accurate.

In an embodiment, the similarity comparison module 120 first divides all the data records of the second category into a plurality of groups, wherein the data records of the second category in the same group corresponds to a same location information, and a time difference between the time information corresponding to the data records of the second category in the same group does not exceed a predetermined value (for example, 10 minutes, though the disclosure is not limited thereto). Then, the similarity comparison module 120 respectively selects the data records of the second category having a highest similarity with the query from each of the groups, and takes all of the selected data records of the second category as the searching results.

Figure 3:
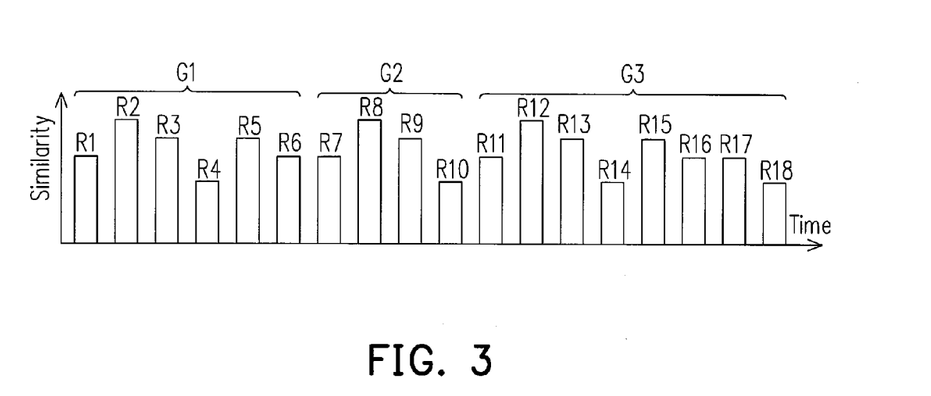
FIG. 3 is a time-similarity bar chart of data records of the second category according to an embodiment of the disclosure.

For example, FIG. 3 is a time-similarity bar chart of the data records of the second category according to an embodiment of the disclosure, where a horizontal axis represents time, and a vertical axis represents the similarity between each data record of the second category and the query. As shown in FIG. 3, it is assumed that the similarity comparison module 120 selects 18 data records of the second category, after arranging the foregoing data records of the second category according to the time information thereof, they are indicated as the data records of the second category R1-R18, where a time difference between the time information corresponding to the adjacent two data records of the second category does not exceeds the predetermined value, and the division of the groups may be implemented by checking whether the data records of the second category corresponds to the same location information. In the present embodiment, the similarity comparison module 120 divides the data records of the second category R1-R18 into groups G1, G2 and G3, and since the data records of the second category R2, R8 and R12 in the groups G1, G2 and G3 are respectively the data records of the second category having the highest similarity with the query, the data records of the second category R2, R8 and R12 are selected as the searching results.

In another embodiment, the similarity comparison module 120 may also divide all the data records of the second category into a plurality of groups according to a method similar as that described above, and select the data records of the second category having the highest similarity with the query from each of the groups. However, regarding all of the selected data records of the second category, the similarity comparison module 120 refers to the time information and the location information corresponding to each two data records of the second category adjacent to each other in time sequence to determine whether to retain the two data records of the second category, to retain one of the two data records of the second category, or to eliminate both of the two data records of the second category. The similarity comparison module 120 takes all of the retained data records of the second category as the searching results.

In the present embodiment, the similarity comparison module 120 determines how to retain or eliminate the data records of the second category based on the environment the system 100 is being used in. For example, it is assumed that the system 100 is applied to the surveillance camera network on the road, and the query is a specified license plate number. Since all the data records of the second category in the same group are obtained from videos captured by the same surveillance camera, and the corresponding time information and the location information are respectively shooting time points and a setting position of the surveillance camera, according to the embodiment of FIG. 3, if the data record of the second category R2 is taken by a surveillance camera X, and the data record of the second category R8 is taken by a surveillance camera Y, when a time difference TD between the time information respectively corresponding to the data records of the second category R2 and R8 is too small, and a distance DD between the location information respectively corresponding to the data records of the second category R2 and R8 is too large, it represents that a vehicle having the license plate number to be examined is nearly impossible to move from the surveillance camera X to the surveillance camera Y within the time difference TD. Since the possibility of the aforementioned movement is not high, the similarity comparison module 120 selects to retain one of the data records of the second category R2 and R8, which may be determined according to the time information and the location information of the data record of the second category R12.

Figure 4:
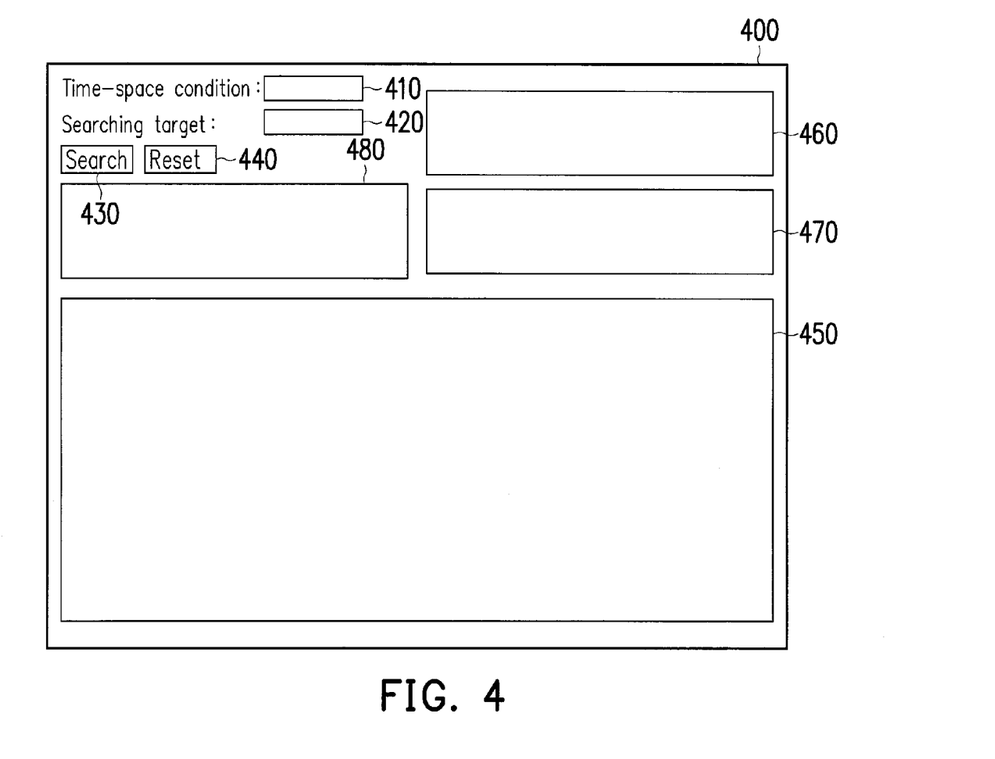
FIG. 4 is a schematic of a user interface according to an embodiment of the disclosure.

After the searching results are selected, the similarity comparison module 120 displays all of the searching results on the user interface according to a time sequence of the time information corresponding to the searching results. FIG. 4 is a schematic of the user interface according to an embodiment of the disclosure. Referring to FIG. 4, the user interface 400 includes input fields 410 and 420, which are respectively used to receive inputs of the time-space searching condition and the query. After the user connects the system 100 through the user terminal, the user may use a display device and an input device of the user terminal to browse and operate the user interface 400. For example, the display device may be a screen, a projector, or a television, and the input device may be a keyboard, a mouse, a stylus, a remote control or a touch screen, etc., though the disclosure is not limited thereto. An option 430 is used to trigger the system 100 to start searching. An option 440 is used to clear the input fields 410 and 420 to facilitate the user re-input the time-space searching condition and the query. After the user click the option 430, the system 100 displays the searching results selected by executing the steps S210 to S240 of FIG. 2B in a region 450. Namely, the region 450 is used to display the searching results selected by the similarity comparison module 120, where the searching results are arranged in the region 450 according to the time sequence of the corresponding time information thereof, and a display size of each of the searching results in the region 450 corresponds to the similarity between each of the searching results and the query, for example, a magnitude of the display size is proportional to a level of the similarity. The regions 460 and 470 are used by the user to perform similarity decreasing operations or similarity increasing operations on the searching results displayed in the region 450, and an operation method thereof is described later. The region 480 is used to display a final formal searching result. It should be noticed that a configuration manner shown in the user interface 400 is only an example, and the appearance of the user interface is not limited by the disclosure.

If the user performs the similarity decreasing operation or the similarity increasing operation on one or more searching results through the user terminal, in step S250, the interactive module 130 receives the user input corresponding to the searching result from the user interface. In an embodiment, the user input corresponding to the similarity increasing operation is, for example, to click a certain searching result displayed in the region 450 and drags the same to the region 460, and the user input corresponding to the similarity decreasing operation is, for example, to click a certain searching result displayed in the region 450 and drags the same to the region 470. In another embodiment, the user input corresponding to the similarity increasing operation is, for example, to input content of a certain searching result displayed in the region 450 to the region 460, and the user input corresponding to the similarity decreasing operation is, for example, to input content of a certain searching result displayed in the region 450 to the region 470.

In step S260, the similarity comparison module 120 determines a display manner of each of the searching results on the user interface and calibrates the similarity between each of the searching results and the query according to all of the user inputs, the similarity between each of the searching results and the query before calibration, and the time information corresponding to each of the searching results, so as to select a plurality of formal searching results from all of the searching results.

In detail, for each of the user inputs, the similarity comparison module 120 determines whether the user input corresponds to the similarity decreasing operation or the similarity increasing operation, and accordingly changes the display size of the corresponding searching result on the user interface and changes the similarity between the corresponding searching result and the query. For example, when the user input corresponding to a certain searching result is the similarity decreasing operation, the similarity comparison module 120 decreases the similarity between the searching result and the query, and reduces the display size of the searching result on the user interface. When the user input corresponding to a certain searching result is the similarity increasing operation, the similarity comparison module 120 increases the similarity between the searching result and the query, and enlarges the display size of the searching result on the user interface. A decreasing ratio or an increasing ratio of the similarity is, for example, based on various weight value quantization methods usually used in a user feedback mechanism, which is not limited by the disclosure.

Besides, the similarity comparison module 120 selects the searching results that have the similarity with the query higher than a threshold value from all of the searching results to serve as the formal searching results. In an embodiment, the threshold value may be a fixed value (which is, for example, expressed in percentage) set by the system 100. In another embodiment, the threshold value is, for example, a statistic value of the similarities corresponding to all of the searching results, for example, an average or a high standard average, etc., which is not limited by the disclosure.

As shown in FIG. 2, the system 100 compares the similarity between the query and the data records of the object complied with the time-space searching condition in the object database, and during the comparison process, dependency between the data records in the object database is considered for selecting the searching results. Then, the display sizes of the searching results on the graphical user interface are scaled according to levels of the similarities, and meanwhile the searching results are displayed in a time sequence. Since the user may interact with the system 100 from the user interface, and perform corresponding feedback on the searching results, the system 100 may further calibrate the searching results according to the user's feedback, so as to improve searching accuracy.

Figure 5:
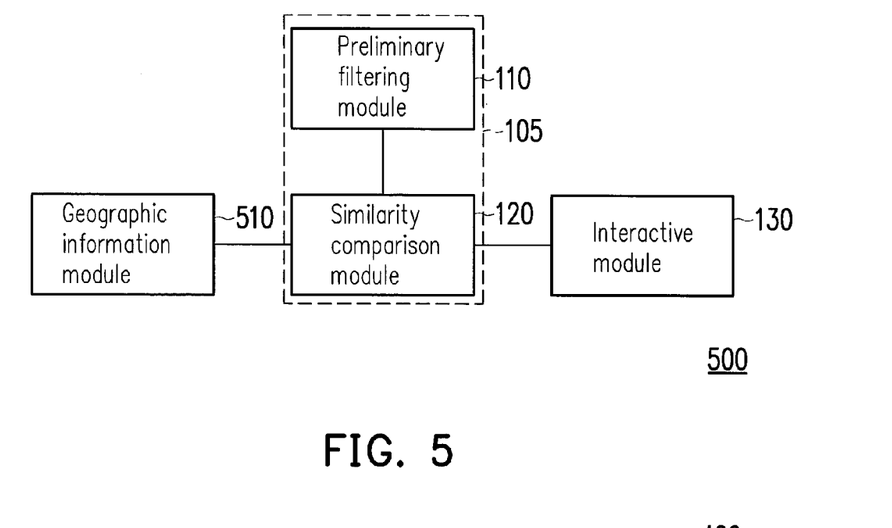
FIG. 5 is a schematic diagram of an interactive object retrieval system based on association information according to another embodiment of the disclosure.

FIG. 5 is a schematic diagram of an interactive object retrieval system based on association information according to another embodiment of the disclosure. Referring to FIG. 5, the interactive object retrieval system based on association information 500 (referring to as the system 500 in the following) includes the filtering module 105 (including the preliminary filtering module 110 and the similarity comparison module 120), the interactive module 130 and a geographic information module 510. Since the preliminary filtering module 110, the similarity comparison module 120 and the interactive module 130 of the system 500 are the same or similar to the devices having the same referential numbers in the system 100 of FIG. 1, details thereof are not repeated.

The geographic information module 510 is coupled to the similarity comparison module 120, and is used to provide a map. After the similarity comparison module 120 selects the formal searching results, the location information corresponding to the formal searching results are connected on the map according to the time information corresponding to each of the formal searching results, so as to display a moving track of the object on the map.

Figure 6:
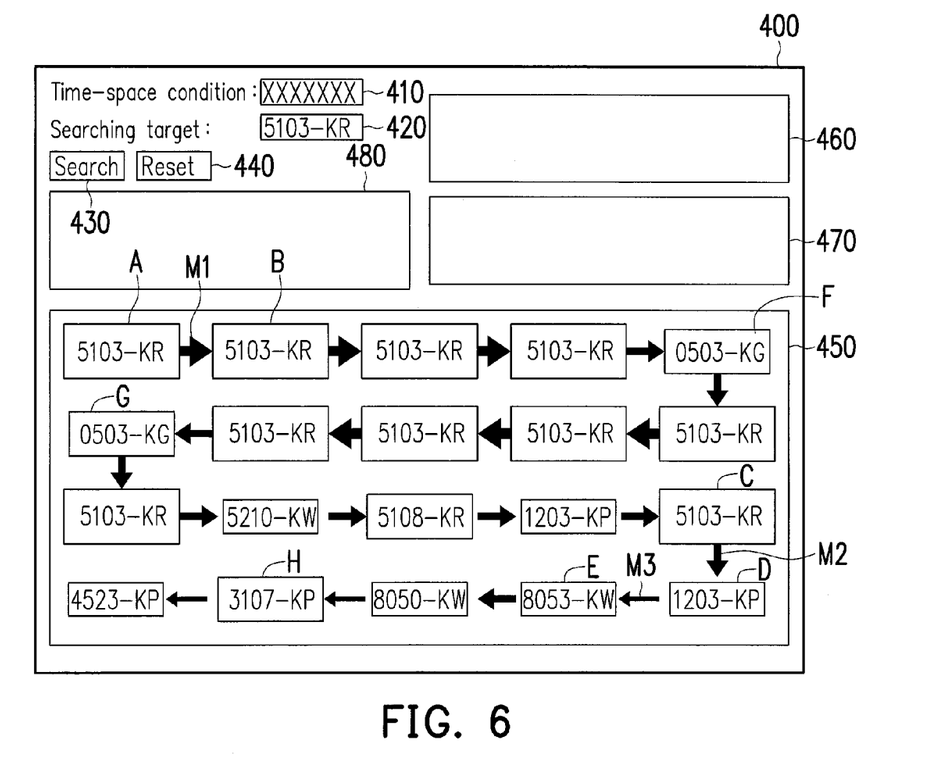
FIGS. 6, 7 and 8 are schematic diagrams of searching a specific license plate by using an interactive object retrieval system based on association information according to an embodiment of the disclosure.
Figure 7:
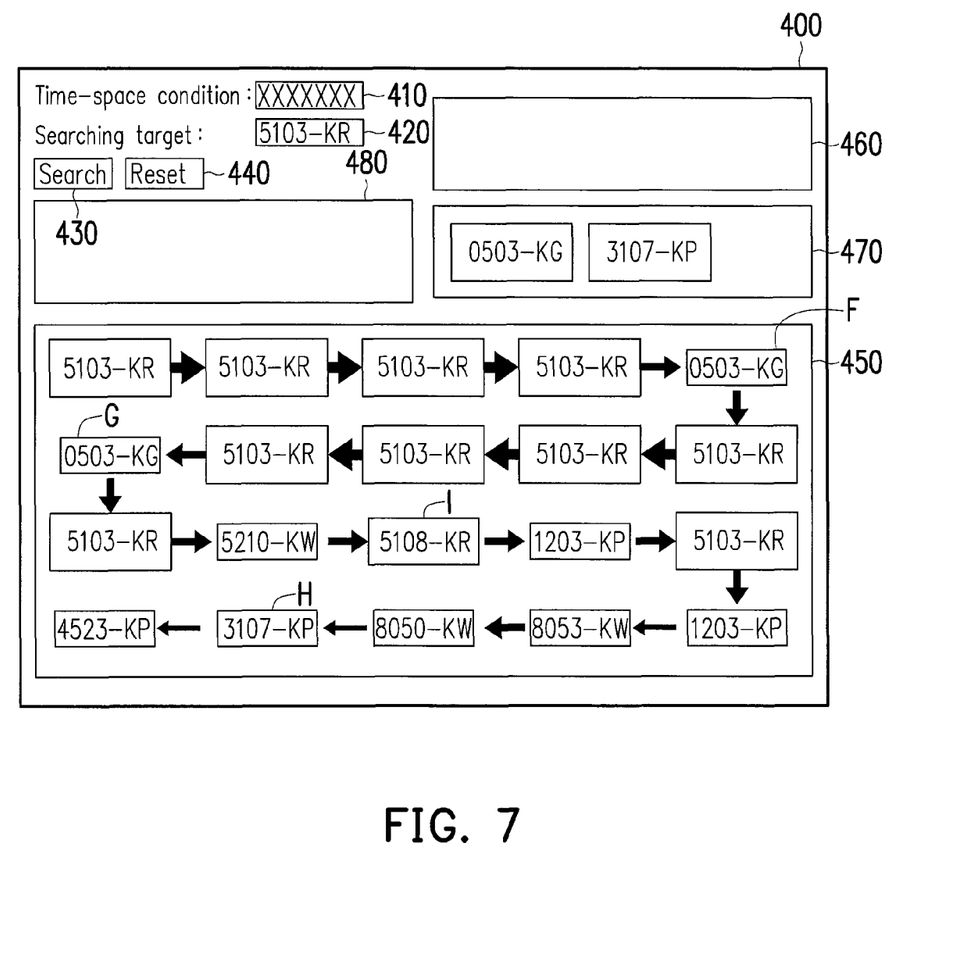
Figure 8:
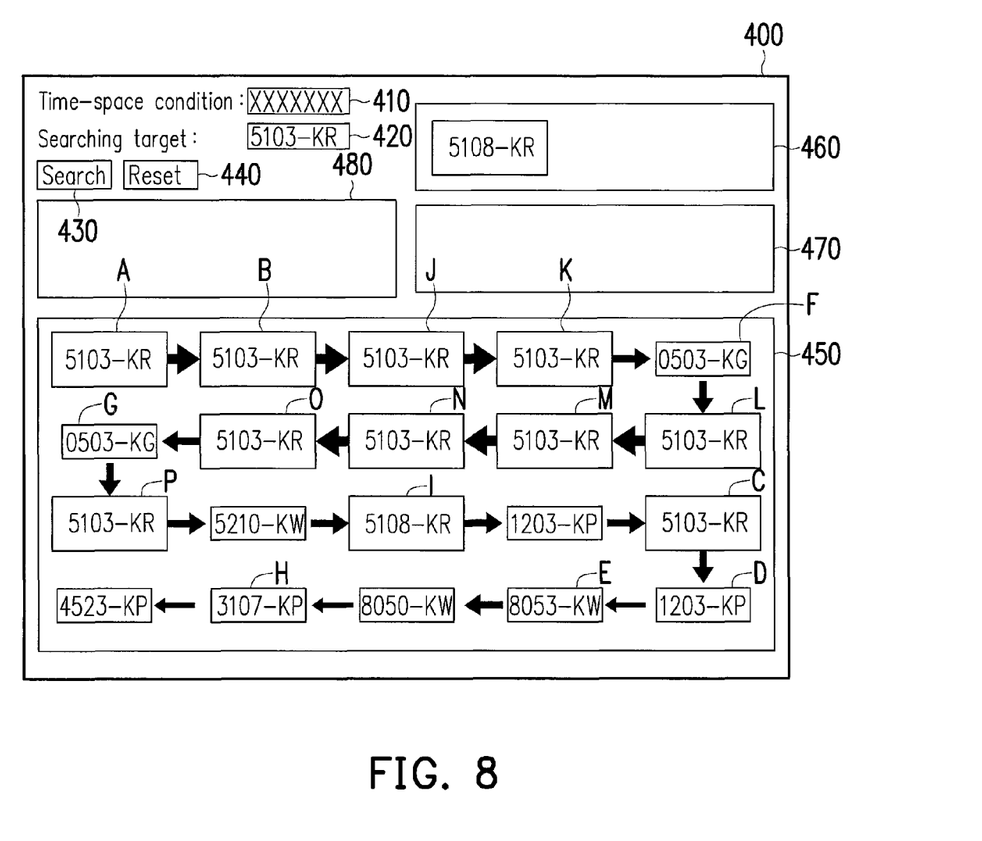

In the following embodiment, it is assumed that the system 500 is used in an interactive searching environment required by a local police unit, where the object database records videos captured by all of the road surveillance cameras within a jurisdiction area thereof. FIGS. 6, 7 and 8 are schematic diagrams of searching a specific license plate by using the system 500 according to an embodiment of the disclosure.

If the police unit wants to query appearance time and locations of a vehicle with a specific license plate (for example, 5103-KR) within a specific range of the jurisdiction area within a specific date, after a searcher of the police unit connects the system 500 through a computer device of the user terminal, the user interface 400 of FIG. 4 is displayed. After the searcher inputs information of a specific date and a specific range (i.e. the time-space searching condition) to be queried into the input field 410, and inputs the specific license plate (i.e. the query) into the input field 420, and clicks the option 430, the preliminary filtering module 110 first obtains all of license plate images captured within the specific date and the specific range from the videos recorded in the object database, wherein the license plate images are the data records of the first category.

Then, the similarity comparison module 120 compares a similarity between the query and each of the data records of the first category (i.e. compares a similarity between the specific license plate and the license plate in each of the license plate images obtained by the preliminary filtering module 110), so as to obtain a plurality of data records of the second category from all the data records of the first category.

The similarity comparison module 120 arranges all the data records of the second category according to a time sequence, and selects one data record (with a license plate most similar to the specific license plate) from all of the data records of the second category captured by a same road surveillance camera within a similar time. Regarding all of the selected data records of the second category, the similarity comparison module 120 determines whether some the data records of the second category are mutually exclusive and some the data records of the second category are mutually enhanced according to the corresponding time information and the location information, so as to determine whether to eliminate some the data records of the second category, or increase the similarities corresponding to some the data records of the second category to be retained. Finally, all of the retained data records of the second category are regarded as the searching results. Namely, the searching results have a considerable degree of dependency other than mutual independence without association.

FIG. 6 is a frame content displayed on the user interface 400 after the searching results are selected. It is assumed that the similarity comparison module 120 selects 20 searching results (the license plate images), and in the region 450, the 20 searching results are displayed in a sequence according to the corresponding time information. For example, the similarity comparison module 120 sequentially selects the searching result corresponding to the earliest time information from the search results and displays all of the searching results in the region 450 from a top left corner according to a Z-shape arrangement, where the top left corner of the region 450 displays the searching result with the earliest corresponding time information, and the Z-shape arrangement refers to an arrangement started from the top left corner of the region 450 and moving rightwards, downwards, leftwards, downwards, and again rightwards, downwards, leftwards and downwards, and so on. It should be noticed that such arrangement method is only an example, and the disclosure is not limited thereto. A display size of each of the searching results in the region 450 corresponds to the similarity between the license plate and the specific license plate. For example, since the specific license plate to be queried is "5103-KR", the display size of the searching results having the license plate of "5103-KR" is greater than that of the searching results having the license plate of "5210-KW".

It should be noticed that regarding each two searching results adjacent to each other in time sequence, the similarity comparison module 120 displays an association mark (for example, an arrow symbol shown in the region 450 of FIG. 6) between the two searching results, and in the present embodiment, an appearance of the association mark (for example, thickness and color, etc., though the disclosure is not limited thereto) corresponds to the similarity between the two searching results. It is assumed that the thickness of the appearance of the association mark is proportional to the similarity between the two searching results adjacent to each other in time sequence, as shown in FIG. 6, the user can determine that the similarity between the searching results A and B is higher than the similarity between the searching results C and D, and the similarity between the searching results C and D is higher than the similarity between the searching results D and E according to the association marks M1, M2 and M3.

In another embodiment, the appearance of the association mark corresponds to the association between the location information corresponding to two searching results adjacent to each other in time sequence, for example, the thickness of the appearance of the association mark is proportional to a level of the association of the location information. The level of the association of the location information may be determined with reference of road information. For example, when the road information indicates that the two location information respectively corresponding to the searching results A and B are all in a same one-way street, and a vehicle moving direction is from the location information corresponding to the searching result A to the location information corresponding to the searching result B. In this way, the level of the association between the two location information corresponding to the searching results A and B is relatively high, and the appearance of the corresponding association mark is relatively thick, so that the user can easily determine that the searching results A and B have a high possibility of occurring in succession. Conversely, if the vehicle moving direction of the one-way street is from the location information corresponding to the searching result B to the location information corresponding to the searching result A, the level of the association between the two location information corresponding to the searching results A and B is relatively low, and the appearance of the corresponding association mark is relatively thin, and the user can determine that the searching results A and B have a low possibility of occurring in succession.

In still another embodiment, the appearance of the association mark simultaneously corresponds to the similarity between two searching results adjacent to each other in time sequence and the association between the two location information corresponding to the two searching results.

According to the display size of each of the searching results and the appearance of the association mark between each two of the adjacent searching results, the searcher may intuitively and quickly select the searching results with high possibility, and filters out the searching results with low possibility. For example, although the display sizes of the searching results F, G and H are slightly smaller than that of the searching results with the maximum display size (for example, the searching results A and B, etc.), the searchers can easily recognize that the difference between the license plates in the searching results F, G and H and the specific license plate (5103-KR) to be queried is very large, and since such situation may be a result of recognition error, the searcher may click the searching result F and drags the same to the region 470, and such operation is the similarity decreasing operation corresponding to the searching result F. Therefore, the similarity comparison module 120 decreases the similarity between the searching result F and the query. Since the license plate in the searching result G is the same with that in the searching result F, even if the searcher does not perform any operation on the searching result G, the similarity comparison module 120 still decreases the similarity between the searching result G and the query. Similarly, the searcher may click the searching result H and drags the same to the region 470, and such operation is the similarity decreasing operation corresponding to the searching result H, and the similarity comparison module 120 decreases the similarity between the searching result H and the query.

After the similarity decrease, the user interface 400 is as that shown in FIG. 7. Comparing FIG. 6 with FIG. 7, it is shown that the display sizes of the searching results F, G and H are decreased, which respectively represents that the similarity with the query is decreased.

On the other hand, if the searcher considers a searching result I to be a correct searching result, the searcher may click the searching result I and drags the same to the region 460, and such operation is the similarity increasing operation corresponding to the searching result I. Therefore, the similarity comparison module 120 increases the similarity between the searching result I and the query.

After the similarity increase, the user interface 400 is as that shown in FIG. 8. Comparing FIG. 7 with FIG. 8, it is discovered that the display size of the searching result I is increased, which represents that the similarity with the query is increased.

After the similarity decrease operation and/or the similarity increase operation, the similarity comparison module 120 selects the searching results that have the similarity with the query higher than a threshold value (for example, 90%) from all of the searching results to serve as the formal searching results. In the present embodiment, the similarity comparison module 120 selects the searching results A, B, J, K, L, M, N, O, P, I and C to serve as the formal searching results, and the aforementioned formal searching results may be automatically displayed in the region 480. In another embodiment, the searcher may manually drag a suitable searching result to the region 480 to serve as the formal searching result.

Figure 9:
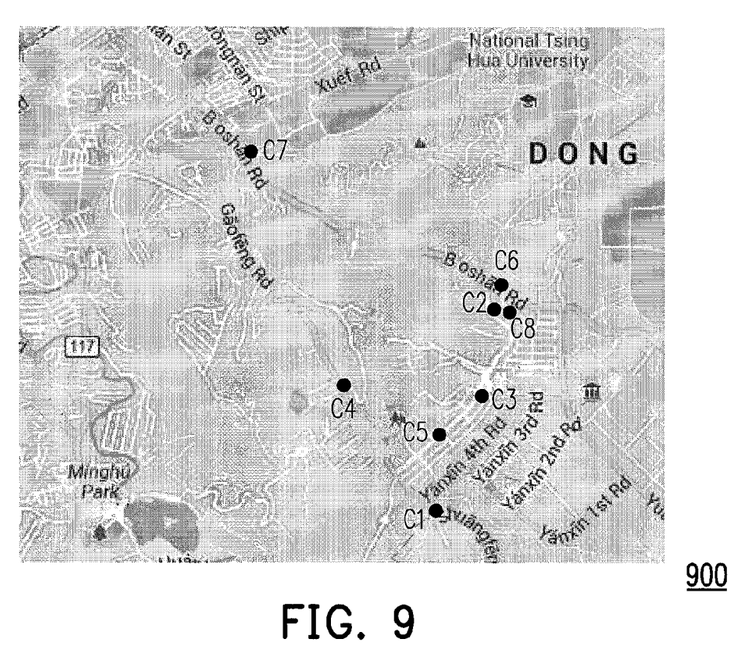
FIG. 9 is a schematic diagram of a map according to an embodiment of the disclosure.

Then, the similarity comparison module 120 obtains the map provided by the geographic information module 510. As shown in FIG. 9, the map 900 obtained by the similarity comparison module 120 covers a specific range to be searched, and marks all of the road surveillance cameras within the specific range, where C1 to C8 represent locations of the road surveillance cameras.

Figure 10:
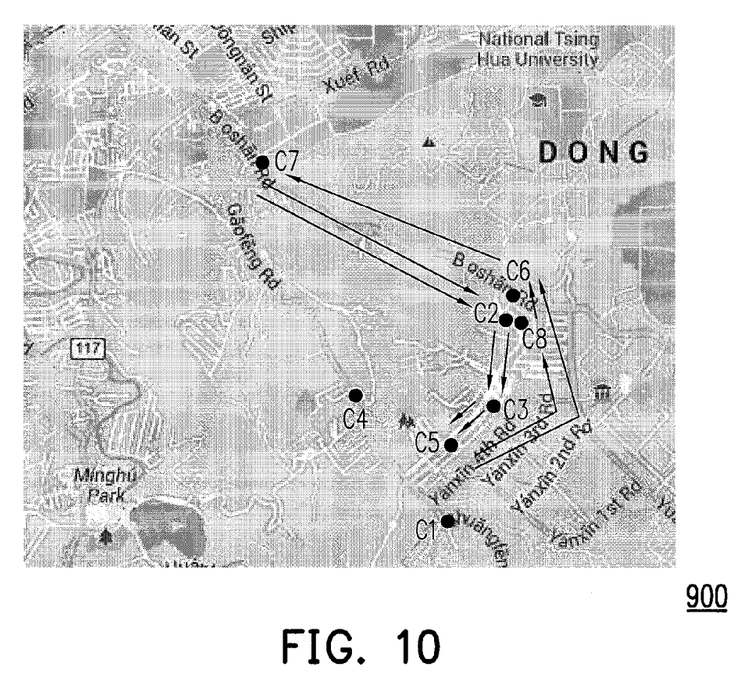
FIG. 10 is a schematic diagram of displaying an object moving track on a map according to an embodiment of the disclosure.

Since each of the formal searching results is acquired from the video captured by one of the road surveillance cameras located at the locations C1 to C8, the location information corresponding to each of the formal searching result is one of the locations C1-C8. As shown in FIG. 10, the similarity comparison module 120 connects the location information corresponding to each of the formal searching results one-by-one on the map 900 according to the time information corresponding to each of the formal searching results, so as to display an object moving track on the map 900. In the present embodiment, the object moving track is started from the location C7, and is sequentially moved to the location C2, the location C3, the location C5, the location C8, the location C6, the location C7, the location C2, the location C3, the location C5 and is ended at the location C6, which represents that the vehicle with the specific license plate (i.e. 5103-KR) probably conducts the aforementioned movement within the specific range at the specific date to be queried.

According to the above descriptions, the preliminary searching results are presented on the user interface according to timing of each of the searching results and similarity between each of the searching results and the query, so as to facilitate the user to intuitively perform relevant feedback on the preliminary searching results, and generate more accurate formal searching results according to the user's feedback.

In summary, during the process of generating the searching results by using the interactive object retrieval method and system based on association information, similarities between the data records about an object in the object database and the query and dependency between the data records in the object database are considered, and the similarity between each searching result and the query is reflected to the display size of the searching result through a geographic display method. In this way, convenience that the user performs feedback on the searching result is improved, and a more accurate searching result is generated according to the user feedback. Moreover, in a specific application, the interactive object retrieval method and system based on association information may connect all of the formal searching results as a track on the map to facilitate querying of the user. Therefore, besides improving the searching accuracy, the interactive object retrieval method and system based on association information of the disclosure further provides an intuitive user interface to improve convenience of the searching operation.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:
1. An interactive object retrieval method, comprising:
  receiving a query and a time and space searching condition;
  selecting a plurality of data records of a first category complied with the time and space searching condition from an object database;
  comparing a similarity between the query and each of the data records of the first category to obtain a plurality of data records of a second category wherein a time information and a location information are corresponding to each of the data records of the second category;
  dividing the data records of the second category into a plurality of groups, wherein the data records of the second category in a same group correspond to a same location information, and a time difference between the time information corresponding to the data records of the second category in the same group does not exceed a predetermined value;
  respectively selecting the data records of the second category having a highest similarity with the query from each of the groups;
  taking all of the data records of the second category which are selected as a plurality of searching results;
  receiving at least one user input corresponding to at least one of the searching results from a user interface, wherein each of the at least one user input corresponds to a similarity decreasing operation or a similarity increasing operation; and
  determining a display manner of each of the searching results on the user interface according to the at least one user input and a similarity between the query and each of the searching results, comprising
    for each of the at least one user input, determining whether the user input corresponds to the similarity decreasing operation or the similarity increasing operation, so as to change a display size of one of the searching results on the user interface and to change the similarity between the query and the one of the searching results, wherein the one of the searching results is corresponding to the user input; and
  selecting the searching results that have the similarity with the query higher than a threshold value from all of the searching results to serve as a plurality of formal searching results.

2. The interactive object retrieval method as claimed in claim 1, wherein the step of taking all of the data records of the second category which are selected as the searching results comprises:
  for each two data records of the second category adjacent to each other in a time sequence among all of the data records of the second category which are selected, retaining at least one of the two data records of the second category adjacent to each other in the time sequence according to the time information and the location information corresponding thereto; and
  taking all of the data records of the second category which are retained as the searching results.

3. The interactive object retrieval method as claimed in claim 1, wherein after the step of taking all of the data records of the second category which are selected as the searching results, the method further comprises:
  displaying the searching results on the user interface according to a time sequence of the time information corresponding to each of the searching results, wherein the display size of each of the searching results on the user interface corresponds to the similarity between each of the searching results and the query.

4. The interactive object retrieval method as claimed in claim 1, wherein after the step of taking all of the data records of the second category which are selected as the searching results, the method further comprises:
  displaying an association mark between each two searching results adjacent to each other in a time sequence, wherein an appearance of the association mark corresponds to a similarity between the two searching results and/or corresponds to an association between the location information corresponding to the two searching results.

5. The interactive object retrieval method as claimed in claim 1, further comprising:

displaying an object moving track on a map by connecting the location information corresponding to each of the formal searching results on the map according to the time information corresponding to each of the formal searching results.

6. The interactive object retrieval method as claimed in claim 1, wherein both of the data records of the first category and the data records of the second category are all of a plurality of data records in the object database.

7. An interactive object retrieval system, comprising:

a filtering module, comprising:

a preliminary filtering module, selecting a plurality of data records of a first category complied with a time and space searching condition from an object database; and a similarity comparison module, coupled to the preliminary filtering module, receiving the data records of the first category from the preliminary filtering module, comparing a similarity between the query and each of the data records of the first category to obtain a plurality of data records of a second category wherein a time information and a location information are corresponding to each of the data records of the second category, and dividing the data records of the second category into a plurality of groups, wherein the data records of the second category in a same group correspond to a same location information, and a time difference between the time information corresponding to the data records of the second category in the same group does not exceed a predetermined value, wherein the similarity comparison module respectively selects the data records of the second category having a highest similarity with the query from each of the groups, and takes all of the data records of the second category which are selected as a plurality of searching results; and an interactive module, coupled to the filtering module, receiving at least one user input corresponding to at least one of the searching results, and providing a user interface, wherein each of the at least one user input corresponds to a similarity decreasing operation or a similarity increasing operation, wherein the filtering module determines a display manner of each of the searching results on the user interface according to the at least one user input and a similarity between the query and each of the searching results, wherein for each of the at least one user input, the similarity comparison module determines whether the user input corresponds to the similarity decreasing operation or the similarity increasing operation, so as to change a display size of one of the searching results on the user interface and to change the similarity between the query and the one of the searching results wherein the one of the searching results is corresponding to the user input, and selects the searching results that have the similarity with the query higher than a threshold value from all of the searching results to serve as a plurality of formal searching results.

8. The interactive object retrieval system as claimed in claim 7, wherein the similarity comparison module for each two data records of the second category adjacent to each other in a time sequence among all of the data records of the second category which are selected, the similarity comparison module retains at least one of the two data records of the second category adjacent to each other in the time sequence according to the time information and the location information corresponding thereto, the similarity comparison module takes all of the data records of the second category which are retained as the searching results.

9. The interactive object retrieval system as claimed in claim 7, wherein the similarity comparison module displays the searching results on the user interface according to a time sequence of the time information corresponding to each of the searching results, wherein the display size of each of the searching results on the user interface corresponds to the similarity between each of the searching results and the query.

10. The interactive object retrieval system as claimed in claim 7, wherein the similarity comparison module displays an association mark between each two searching results adjacent to each other in a time sequence, wherein an appearance of the association mark corresponds to a similarity between the two searching results and/or corresponds to an association between the location information corresponding to the two searching results.

11. The interactive object retrieval system as claimed in claim 7, further comprising:

a geographic information module, coupled to the filtering module, providing a map, wherein the filtering module connects the location information corresponding to each of the formal searching results on the map according to the time information corresponding to each of the formal searching results, so as to display an object moving track on the map.

12. The interactive object retrieval system as claimed in claim 7, wherein both of the data records of the first category and the data records of the second category are all of a plurality of data records in the object database.

* * * * *